United States Patent

[11] 3,624,480

[72] Inventors Robert W. Campbell;
Donald L. Cummins, both of Anderson, Ind.
[21] Appl. No. 88,590
[22] Filed Nov. 12, 1970
[45] Patented Nov. 30, 1971
[73] Assignee General Motors Corporation
Detroit, Mich.

[54] DUAL BATTERY CHARGER HAVING DUAL OUTPUT
4 Claims, 1 Drawing Fig.

[52] U.S. Cl. ............................................. 320/15, 320/40, 320/64
[51] Int. Cl. .............................................. H02j 7/10, H02j 7/24
[50] Field of Search ............................................. 320/7, 12, 15–19, 22, 39, 40, 64, 68, 61; 322/28, 36

[56] References Cited
UNITED STATES PATENTS

| | | | |
|---|---|---|---|
| 1,430,106 | 9/1922 | Ogden | 320/18 |
| 3,108,192 | 10/1963 | Reich | 320/18 X |
| 3,217,229 | 11/1965 | Ballard | 320/68 |
| 3,206,610 | 9/1965 | Lovrenich | 320/15 X |
| 3,465,230 | 9/1969 | Ball | 320/39 X |
| 3,469,168 | 9/1969 | Harland, Jr. et al. | 322/28 X |

FOREIGN PATENTS

| | | | |
|---|---|---|---|
| 496,660 | 8/1919 | France | 320/17 |

Primary Examiner—J. D. Miller
Assistant Examiner—Robert J. Hickey
Attorneys—E. W. Christen, C. R. Meland and A. F. Duke ABSTRACT: First and second batteries are connected in series between a point of constant reference potential and the output terminal of a first full-wave bridge rectifier. The output terminal of a second full-wave bridge rectifier comprising silicon-controlled rectifiers (SCR) is connected to a junction between the batteries. The respective legs of the first and second rectifiers are each connected to the same output winding of the stator of an alternator. A first voltage detector responsive to the voltage across the first and second terminals causes the SCR's to be nonconductive when the voltage across the first and second terminals is less than a first predetermined voltage. A second voltage detector controls the current through the field winding of the alternator in response to the voltage at the junction between the batteries to maintain a second predetermined voltage thereat. The drop in current and therefore voltage at the junction occurring an instant after the SCR's are rendered nonconductive causes the second voltage detector to increase the current and voltage at the first output to increase by an amount sufficient to reestablish the second predetermined voltage at the junction.

PATENTED NOV 30 1971
3,624,480
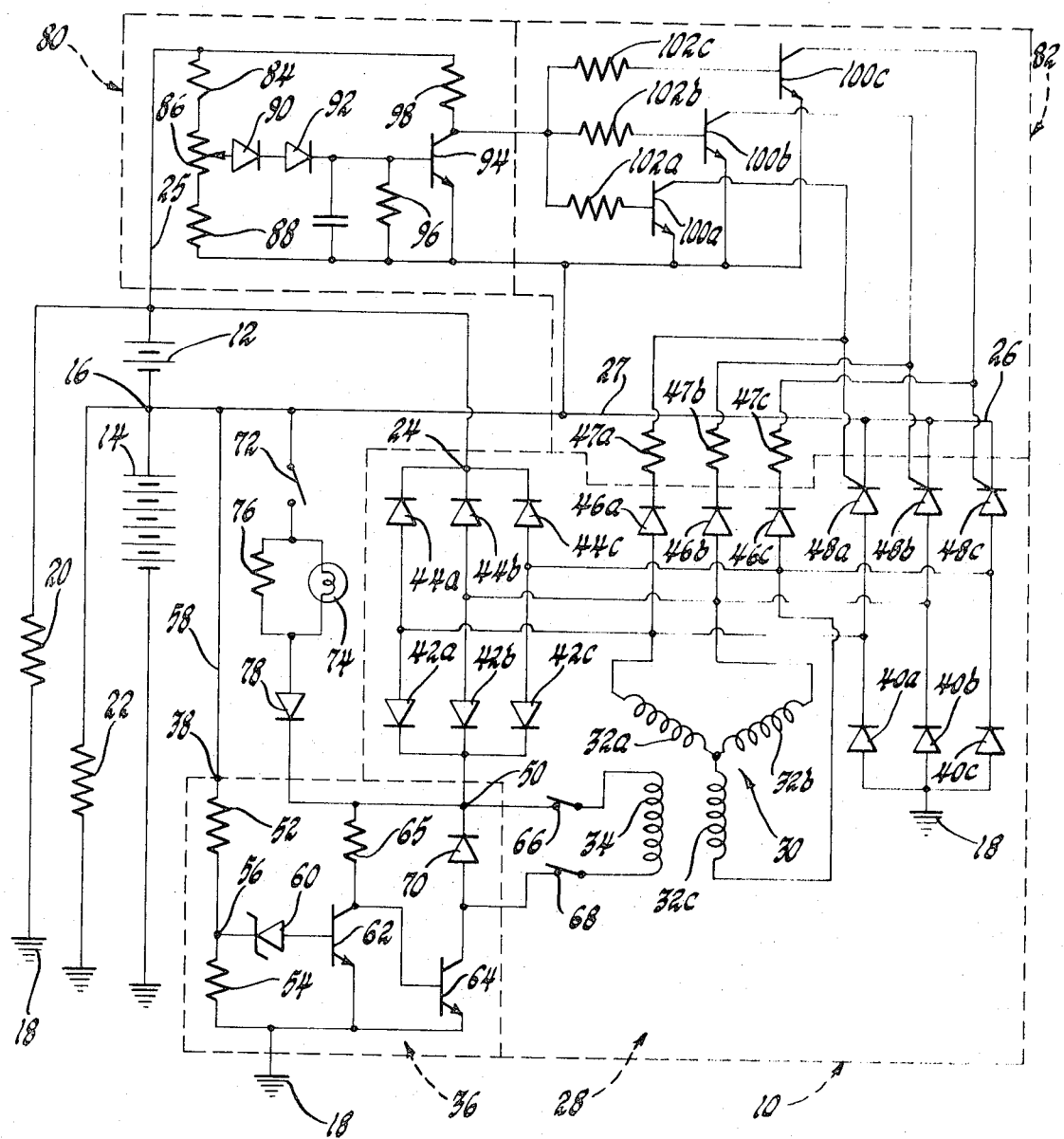
INVENTORS
Robert W. Campbell &
BY Donald L. Cummins
Albert F. Duke
ATTORNEY

DUAL BATTERY CHARGER HAVING DUAL OUTPUT

This invention relates to a system for automatically switching the output voltage of a conventional vehicle charging system from a lower to a higher level to supply respectively one load alone or two loads connected in series.

The electrical accessories of current passenger vehicles are designed to operate from the 12-volt vehicle charging system. However, it is known that the internal resistance of the battery for this 12-volt system increases with decreasing temperature to where there may be inadequate power to start the car at very low temperatures. Various approaches have been heretofore proposed to provide additional starting power without redesigning the accessories for a higher voltage system. Some of these approaches utilize two batteries which are connected in series for starting and are then charged either by continuously charging one battery while trickle charging the other or by connecting the two in parallel and charging both. With the former approach there was a risk of overcharging and with the latter there are the complications and expense of switching. Moreover, the desirability of converting all the electrical accessories to run off a single higher voltage system to satisfy the starting requirements is offset both by the cost of such conversion and by the fact that the other accessories perform satisfactorily on a 12-volt system.

It is, therefore, desirable to have a dual voltage system allowing higher voltages for starting without the risk associated with trickle charging series connected batteries and without reconnecting the batteries in parallel for charging. Thus, it is desirable to provide such a dual voltage system wherein the battery supplying the extra starting voltage is charged on demand. Moreover, it is desirable to charge one or both batteries merely by automatically altering the output levels of a standard vehicle charging system.

It is, therefore, a primary object of the present invention to automatically alter the output levels of a conventional vehicle charging system to charge an auxiliary battery connected in series with the main vehicle battery upon the demand of the auxiliary battery.

It is another object of the present invention to provide a charging system of the foregoing type where the lower of such voltage levels is continuously maintained at the junction between the two batteries and where a change in the output of the charging system from one level to another is effected by correcting a momentary change in the voltage at the junction which occurs as a result of switching the output of the charging system between charging two batteries and just one.

It is a further object of the present invention to provide a dual voltage charging system of the foregoing type wherein one voltage level is provided at the output of a controlled rectifier and the second level is provided at the output of an uncontrolled rectifier and where the momentary change in the voltage at the junction is caused by switching the state of the controlled rectifier between conduction and nonconduction.

It is a further and more specific object of the present invention to provide a charging system of the foregoing type wherein the state of the controlled rectifier is determined by the voltage between the output terminals of the controlled and uncontrolled rectifiers.

These objects are accomplished in the present invention by means of a conventional voltage regulator responsive to the voltage at the junction between first and second series connected batteries to control the current through a field winding of a conventional alternator having three Y-connected output windings. These windings are connected to corresponding AC input terminals of an uncontrolled three-phase, full-wave bridge rectifier and also of a controlled bridge rectifier comprising SCR's. The output terminal of the uncontrolled rectifier is connected across the series connected batteries, and the output terminal of the SCR is connected to the junction between the series connected batteries. When the voltage across the output terminals of the rectifiers is less than a first predetermined voltage, a detector connected across the output terminals is operative to render the SCR's in the controlled bridge rectifier nonconductive, thereby allowing the batteries to be charged in series from the output of the uncontrolled rectifier. However, since current does not flow from the uncontrolled rectifier until the alternator produces a higher output and since the cutting off of the SCR does not result in an instantaneous change in the output of the alternator, the voltage at the junction between the batteries falls below a second predetermined voltage. This drop is sensed by a second voltage detector operative to increase the current through the field winding of the alternator until the output of the alternator is sufficient to charge both batteries and reestablish the second predetermined voltage at the junction. When the voltage across the first and second terminals exceeds the first predetermined voltage, the first voltage detector renders the SCR's conductive so that the voltage at the junction exceeds the second predetermined voltage, causing the second voltage detector to decrease the output of the alternator until the second predetermined voltage is reestablished. The output of the alternator accordingly cycles between two levels, the higher of which corresponds to substantially the sum of the first and second predetermined voltages and the lower of which corresponds to the second predetermined voltage.

Further objects, advantages and details of the present invention will become apparent from the following description taken in connection with the single drawing which shows a preferred embodiment of the invention for charging two series connected batteries from the dual outputs of a single charging system.

With reference now to the single drawing, there is shown a system 10 for charging series connected batteries 12 and 14, the negative terminal of battery 12 and the positive terminal of battery 14 defining a junction 16 therebetween. Connected across batteries 12 and 14 are, respectively loads 20 and 22 and also output terminals 24 and 26 of alternator 28 comprised of a stator 30 having three Y-connected output windings 32a, b and c excited in response to current through field winding 34 controlled by voltage regulator 36, the sense input terminal 38 of which is connected to junction 16. The ends of stator windings 32a, b and c are connected to the corresponding legs or AC input terminals of three three-phase, full-wave bridge rectifiers sharing a common negative bank of uncontrolled diodes 40a, b and c, the anodes of which are grounded at 18. Two of the rectifiers have positive banks of uncontrolled diodes 42a, b and c and 44a, b and c, and the third rectifier has a positive bank of controlled diodes in the form of SCR's 48a, b and c. The cathodes of diodes 42 are connected to supply terminal 50 of regulator 36; the cathodes of diodes 44 are connected to output terminal 24; and the cathodes of SCR's 48a, b and c are connected to output terminal 26. Diodes 46a, b and c are connected between the respective anodes and gates of SCR's 48a, b and c to prevent inadvertent firing of the SCR's due to feedback from the gates. Alternator 28 is thus representative of a conventional alternator to which a positive bank of controlled diodes 48 has been added to stator windings 32 in parallel with diode trio 42 and output diodes 44.

Regulator 36, representative of a conventional voltage regulator for vehicle charging systems, is here comprised of voltage dividing resistors 52 and 54 defining a node 56 therebetween and connected between junction 16 and ground 18 by sense lead 58 connected to regulator sense terminal 38. Connected to node 56 via Zener diode 60 is NPN-transistor 62, the collector of which is connected to the base of output transistor 64. The emitters of transistors 62 and 64 are grounded at 18. When the voltage sensed at node 56 is insufficient to break down Zener 60, output transistor 64 is biased into conduction from terminal 50 through resistor 65, and current is conducted to ground 18 through transistor 64 from supply terminal 50 through slip ring and brush set 66, field winding 34, and slip ring and brush set 68. When Zener 60 breaks down in the presence of a sufficient voltage node 56, transistor 62 is rendered conductive and grounds, through its collector to emitter junction, the base of transistor 64, thereby opening the ground path for the field current through coil 34. When such ground path is open, the energy in winding 34 is discharged through diode 70, thereby protecting output transistor 64 from the effects of back E.M.F. that might otherwise be induced.

To energize field winding 34 upon the closure of ignition switch 72 on startup and also to indicate certain undesirable conditions in the charging system, the positive terminal of battery 14 and output terminal 26 of the alternator 28 are connected to supply terminal 50 of regulator 36 via ignition switch 72, indicator lamp 74, and diode 78. Resistor 76 across lamp 74 provides a path for startup field excitation should lamp 74 burn out. Diode 78 prevents the charging of battery 14 and supplying of load 22 from diode trio 42 through indicator lamp 74 and ignition switch 72 when the output of the alternator is increased, as is described below, to charge battery 12 in series with battery 14 rather than just battery 14.

Since charging battery 14 through battery 12 when only battery 14 demands charging risks overcharging and ultimately destroying battery 12, it becomes necessary to charge through the battery 12 only when it is not fully charged, as represented by less than a predetermined voltage thereacross. Therefore, one path must be provided to charge battery 14 alone and another to charge battery 12 in series with battery 14. The first path here is from output terminal 26 of the controlled rectifier via conductor 27 to junction 16, and the latter path is from the output terminal 24 of the uncontrolled rectifier to the positive terminal of battery 12. Which path is used is determined by whether or not SCR's 48 conduct. When SCR's 48 conduct, voltage at the anodes of SCR's 48 is the same as that at the anodes of diodes 44 and is less than the voltage across the series connected batteries so that battery 12 cannot be charged from terminal 24. Therefore, when SCR's 48 conduct, battery 14 is charged alone. However, when SCR's 48 do not conduct and the output of the alternator at output terminal 24 has increased to the voltage at the positive terminal of battery 12, batteries 12 and 14 are charged in series from terminal 24.

The conductivity of SCR's 48 is controlled in response to voltage across output terminals 24 and 26, and thus the voltage across the positive and negative terminals of battery 12, by means of a voltage detector 80 connected thereacross in combination with a gate control circuit 82 connecting the gates of SCR's 48 to the output of detector 80. Voltage detector 80 is here comprised of voltage dividing resistors 84, 86 and 88 connected in series across the alternator output terminals 24 and 26 by means of conductors 25 and 27, respectively. Resistor 86 is an adjustable resistor, the wiper of which is connected to the base of an NPN-transistor 94 through diodes 90 and 92 that are forward biased into conduction when the voltage across dividing resistors 84, 86 and 88 exceeds a predetermined voltage, adjustable by resistor 86 to be the fully charged terminal voltage of battery 12 while being charged. This voltage produces at the wiper of resistor 86 a voltage in excess of that at terminal 26 by an amount including the forward drops of diodes 90 and 92 and the base to emitter drop of transistor 94, thereby forward biasing transistor 94 into conduction across base resistor 96.

Gate control circuit 82 is comprised of NPN-transistors 100a, b and c, the collectors of which are connected to the gates of respective SCR's 48a, b and c, the emitters of which are connected to output terminal 26 via conductor 27, and the bases of which are biased from the positive terminal of battery 12 or output terminal 24 across resistor 98 in voltage detector 80 and base resistors 102a, b and c, respectively. When the voltage across battery 12 attains the predetermined voltage so that transistor 94 is rendered conductive by sufficient voltage at the wiper of resistor 86, transistors 100 are rendered nonconductive as their bases are connected to their emitters through transistor 94. This allows SCR's 48 to be rendered conductive during respective alternate positive half cycles of the voltages on stator windings 32. These voltages are applied across diodes 46 and resistors 47 to the gates of the SCR's 48 so that the latter fire when the voltage at their anodes exceeds that at output terminal 26. Thus, when the voltage across battery 12 is at the predetermined voltage, the voltage at junction 16 is substantially the same as at output terminal 26, and regulator 36, as described above, is operative to maintain the output at terminal 26 at the voltage desired for junction 16.

When battery 12 subsequently discharges so that the voltage thereacross is less than the predetermined amount, transistor 94 in detector 80 is rendered nonconductive by an insufficient voltage at the wiper of resistor 86. Transistors 100a, b and c are then biased into conduction from the positive terminal of battery 12 across resistor 98 and base resistors 102a, b and c. This renders SCR's nonconductive by continuously connecting their gates to their cathodes through transistors 100 and conductor 27.

Since it doesn't change instantaneously, the output of alternator 28 applied to junction 16 from output terminal 26 an instant before SCR's 48 are cut off is the same an instant after and therefore less than the voltage across batteries 12 and 14. This means that battery 12 will not be charged and that no charging current will be available at junction 16 for battery 14 until the output of the alternator is increased to exceed the voltage across both batteries. Therefore, the voltage at junction 16 drops momentarily, accordingly causes voltage regulator 36 to sense a lower than desired voltage at node 56, and in turn renders output transistor 64 conductive. This in turn increases the average current through field winding 34 and consequently the current and voltage at output terminal 24 until the voltage at junction 16 is brought back up to the predetermined value thereat. The charging system produces this higher output until battery 12 is again charged to its predetermined value at which point detector 80 causes transistor 94 to conduct, rendering transistors 100a, b and c nonconductive, and allowing SCR's 48a, b and c to conduct once again. However, the voltage at output terminal 26 at instant after SCR's 48 commence alternate conduction is the same as existed at output terminal 24 at an instant prior to such condition. This means that the current and therefore the voltage at junction 16 is in excess of the predetermined amount, thereby causing output transistor 64 in regulator 36 to be rendered nonconductive until the output of alternator 28 drops back to the desired value at junction 16.

The charging system will thus cycle between two output levels at a rate determined primarily by the size of battery 12 and load 20 relative to battery 14 and load 22. Where load 20 and battery 12 are comparatively small, the rate of cycling will be high because battery 12 will charge rapidly from the full output of alternator 28. This rate may be lowered where the charge rate and current required by battery 12 and load 20 are low by opening or removing one or two diodes 44a, b or c and replacing corresponding SCR's 48a, b and c with uncontrolled diodes. The corresponding gate supply diodes and resistors 46 and 47a, b or c and gate control transistors and resistors 100a, b or c and 102a, b or c may also be removed.

As has been described, a system for supplying two series connected batteries has been effected by means of a conventional regulator and alternator, the rectified output of which is connected across one battery when the voltage across the other battery is greater than a desired voltage and connected across both batteries when the voltage across the other battery is less than the desired amount. Such a system is termed a dual voltage system because the alternator produces one output when supplying one of the series connected loads and a different output when supplying both. While such a dual voltage system may be used in a vehicle electrical system having loads such as starting motors and headlamps requiring higher voltages than other loads such as heaters, air conditioners and radios, such systems may also be gainfully effected in other systems requiring dual voltages applied from a single source.

Therefore, having described one embodiment of the present invention, it is understood that the specific terms and examples are employed in a descriptive sense only and not for the purpose of limitation. Other embodiments of the invention, modifications thereof, and alternatives thereto may be used. We therefore aim in the appended claims to cover such modifications and changes as fall within the true spirit and scope of our invention.

What we claim is new and desire to secure by letters of patent of United States is:

1. In an electrical generating system:
  a. first and second full-wave bridge rectifiers having respective first and second output terminals and a plurality of legs, said second bridge rectifier comprising a controllable unidirectional current conducting device;
  b. first and second batteries connected in series between a point of constant reference potential and said first output terminal, said batteries defining a junction therebetween connected to said second output terminal;
  c. a stator having a plurality of output windings, each said winding connected to a corresponding leg of said first and second bridge rectifiers;
  d. magnetic field means adapted to excite said stator and cause said winding to provide an AC output voltage to said first and second bridge rectifiers;
  e. first voltage detection means responsive to the voltage at said first output terminal and operative to render said controllable device nonconductive when the voltage at said first terminal is less than a first predetermined voltage; and
  f. second voltage detection means responsive to the voltage at said junction and operative to maintain a second predetermined voltage at said junction by controlling the output at one of said first and second terminals,
whereby said voltage at said output windings corresponds substantially with said first predetermined voltage when said controllable unidirectional current conducting device is nonconductive and with said second predetermined voltage when said device is conductive.

2. In an electrical system for a vehicle:
  a. first and second full-wave bridge rectifiers having respectively first and second output terminals and a plurality of AC input terminals, said second bridge rectifier comprising at least one controllable unidirectional current conducting device;
  b. first and second batteries connected in series between a point of constant reference potential and said first output terminal, said batteries defining a junction therebetween connected to said second output terminal;
  c. a stator having a plurality of output windings, each said winding connected to a corresponding AC terminal of said first and second rectifiers;
  d. a field winding connected with at least one of said output windings and energized thereby, and
  e. first and second voltage detection means, said first detection means responsive to the voltage across said first and second output terminals and operative to render said controllable device nonconductive when the voltage across said first and second terminals is less than a first predetermined voltage, and said second voltage detection means responsive to the voltage at said junction and operative through a field current control means to control the current in said field winding to maintain a second predetermined voltage at said junction, whereby the voltage at said junction is continuously maintained at said second predetermined voltage and the voltage at said first output terminal is maintained substantially at the sum of first and second predetermined voltages when said controllable device is nonconductive.

3. A vehicle charging system comprising:
  a. alternator means controllable to produce one of first and second output voltages;
  b. first and second batteries connected in series and defining a junction therebetween, one side of said series connected batteries being connected to a point of constant reference potential;
  c. means responsive to the voltage between the other side of said series connected batteries and said junction and operative to connect said one output voltage of said alternator to said other side of said series connected batteries when said voltage between said other side and said junction is less than a first predetermined voltage whereby both said batteries are charged and to connect the other of said first and second output voltages to said junction when the voltage between said other side and said junction is greater than said first predetermined voltage, whereby one of said first and second batteries is charged; and
  d. a voltage regulator responsive to the voltage at said junction and operatively connected with said alternator means to maintain a second predetermined voltage at said junction, whereby said regulator means controls said alternator means to produce said one of said first and second output voltages when said one output voltage is applied to said other said side of said series connected batteries and to control said alternator means to produce said other of said first and second voltages when said other voltage is applied to said junction.

4. A motor vehicle battery charging system for charging at least two batteries comprising:
  a. an alternating current generator having an output winding and a field winding;
  b. first rectifier means having AC input terminals connected to said output winding and first and second direct current output terminals;
  c. first and second batteries;
  means connecting said batteries in series across said direct current output terminals of said first rectifier means with said first battery connected between said first output terminal and a junction and said second battery connected between said junction and said second output terminal;
  e. a voltage regulating means including field current control means connected with said field winding and said output winding of said generator, said voltage regulating means including voltage sensing means connected between said junction and said second direct current output terminal of said rectifier means whereby the output voltage of said generator is regulated to a value which is a function of the voltage appearing between said junction and said second direct current output terminal of said first rectifier means;
  f. second rectifier means having direct current output terminals and AC input terminals connected with said output winding; and
  g. means responsive to the voltage appearing between said first direct current output terminal of said first rectifier means and said junction causing a direct voltage from said second rectifier means to be applied to said junction when the voltage between said first output terminal and said junction reaches a predetermined value to thereby substantially terminate charging of said first battery and charge said second battery from said second rectifier means.

* * * * *

PO-1050
(5/69)

UNITED STATES PATENT OFFICE
CERTIFICATE OF CORRECTION

Patent No. 3,624,480      Dated November 30, 1971

Inventor(s) Robert W. Campbell et al.

It is certified that error appears in the above-identified patent and that said Letters Patent are hereby corrected as shown below:

Column 4, line 37, "condition" should be -- conduction --.
Column 5, line 63, before "first" insert -- said --.
Column 6, line 38, before "means" insert -- d. --.

Signed and sealed this 20th day of June 1972.

(SEAL)
Attest:

EDWARD M. FLETCHER, JR.
Attesting Officer

ROBERT GOTTSCHALK
Commissioner of Patents